COLIN HOLSTEAD
JOSEPH BAILEY
ROY A. JEFFREYS
        INVENTORS

BY R. Frank Smith
   Thomas W. O'Rourke
        ATTORNEYS

United States Patent Office 3,455,687
Patented July 15, 1969

3,455,687
PHOTOTHERMOGRAPHIC COPYING PROCESS
Colin Holstead, Joseph Bailey, and Roy A. Jeffreys, Harrow, England, assignors to Eastman Kodak Company, Rochester, N.Y., a corporation of New Jersey
Filed Sept. 3, 1965, Ser. No. 487,353
Claims priority, application Great Britain, Nov. 28, 1964, 48,470/64
Int. Cl. G03c 5/04; B44m 5/22
U.S. Cl. 96—27                                       4 Claims

ABSTRACT OF THE DISCLOSURE

Photothermographic copying processes wherein the master sheets contain compounds which will volatilize upon heating and compounds, which on exposure to actinic radiation, decompose and react with the volatile compound in areas of exposure. Upon contacting the master sheet with a receiving sheet and applying heat, the volatile compound is released only in areas where no exposure occurs, thereby causing an image to form on the receiving sheet which image corresponds to the original exposure image.

---

Figure 1:
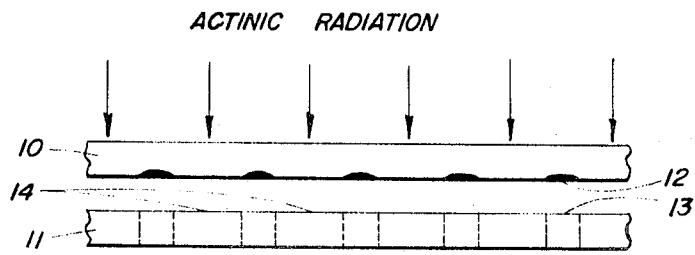

This invention relates to a method of photographic reproduction and to materials for use in the method. More particularly, the invention relates to a method and to materials for photothermographic reproduction.

Photographic and thermographic copying techniques are well known. However, each displays certain restrictive disadvantages and limitations. One of the principal disadvantages of many photographic techniques is the requirement that liquids be used at some stage during processing. Though thermographic processes do not generally require liquid processing steps, such processes are usually limited to copying the materials showing differential absorption of infrared energy. Also, thermographic processes often display a tendency to diffuse the heat pattern thereby substantially lowering the quality of reproduction.

This invention embodies many of the advantages of photography and thermography while substantially avoiding the disadvantages of both processes. Light sensitivity is employed in the instant invention to record the original matter as a latent, or intermediate, image and heat is used to transfer the initial image to a final receiving sheet as a stable, right-reading positive facsimile of the original matter.

It is accordingly an object of the instant invention to provide a method of manufacturing two-dimensional reproductions of original articles.

Another object of the instant invention is to provide a method which is particularly useful for making facsimiles of documents.

Still another object of the instant invention is to provide a method for producing reproductions wherein no liquid processing steps are involved.

Yet another object of the instant invention is to provide a method of producing light stable, right-reading positive copies.

Another object of the instant invention is to provide a method for producing several copies from a single master sheet.

Still another object of the instant invention is to provide master sheets and receiving sheets useful in the aforementioned processes.

Other objects will become apparent upon consideration of the following description and examples.

According to the instant invention, a photographic reproduction is produced by exposing an image by actinic radiation upon a light-sensitive master sheet by means of actinic radiation. The master sheet comprises a support having therein or thereon a photodecomposable compound and a volatile compound which reacts with the decomposition products of the photodecomposable compound to form a less volatile compound. Thereafter, the exposed master sheet is placed in contact with a receiving sheet to form a sandwich which is heated so as to distill or sublime part of the volatile compound left in the non-exposed areas of the layer to the receiving sheet.

Though the master sheet support may be any substance having a solid planar surface, a flexible film is a preferred support. Paper and polymeric sheets are illustrative of the preferred supports.

In an illustrative form of the invention, the volatile compound may be a dye which is capable of reacting with the decomposition products of the photodecomposable compound to form an adjunct or a compound with substantially reduced volatility. In such a case the receiving sheet may be an untreated sheet of paper or other material, although in some cases the presence of a compound which serves as a mordant for the distilled dye may be advantageous. This form of the invention provides images in a variety of colors since many different dyes which will be readily apparent to those skilled in the art are available in suitably reactive and volatile forms.

In another illustrative embodiment of the invention, the volatile compound is itself colorless and the receiving sheet contains a compound which reacts with the volatile compound to form a colored compound. Thus when the volatile compound distills or sublimes to the receiving sheet from the unexposed areas of the light sensitive master sheet, a colored compound is formed. Since the volatile compound in the exposed areas is immobilized by reaction with the decomposition products of the photodecomposable compound, as will be apparent to those skilled in the art, an accurate reproduction of the image exposed upon the master sheet is formed. A wide variety of color-forming reactions can take place between transferred volatile compounds and reactive compounds in the receiving sheet.

It is preferred that the volatile compound be capable of distillation or sublimation to the receiving sheet at a temperature between 50° C. and 200° C. However, the process is operable over a much greater temperature range.

The volatile compound may not be completely transferred to the receiving sheet on the first heating operation. This permits the production of multiple copies from a single exposed master sheet by repeatedly placing a receiving sheet in contact therewith and heating the thus formed sandwich.

A single receiving sheet may also be used repeatedly with several master sheets allowing different originals to be combined on a single sheet. For example, when the volatile compound is a dye, master sheets containing different volatile dyes may be exposed to different originals, for instance to a set of color separation images, and successively placed in contact and in register with the same receiving sheet to build up a multi-color image thereon.

The light sensitive master sheet may in many cases be prepared by coating or imparting a sheet of film, paper or other support with a solution of the photodecomposable compound and the volatile compound in a solvent or mixture of solvents. A substance such as polystyrene, ethyl cellulose or other common binders may be added to form a coating dope.

Many photodecomposable compounds which may be used in the light sensitive master sheet will be readily apparent to those skilled in the art. Some well-known photodecomposable compounds may be only sensitive to blue light or ultraviolet radiation, but is frequently possible to extend the spectral sensitivity of these compounds by the use of a sensitizing compound.

Particularly useful photodecomposable compounds are those within the general class of compounds with a trihalogenomethyl group which produce free radicals upon exposure to light. Such free radicals readily react with many volatile compounds.

Many of these useful photodecomposable compounds are within the class of photodecomposable compounds defined by the formula:

$$R-C(X)_2Y$$

wherein

R is an organic residue or a halogen atom,
X is the same or differing halogen atoms,
Y is a hydrogen atom or a halogen atom.

The halogen is preferably chlorine, bromine or iodine.

Carbon tetrabromide and 2-(tribromomethyl) quinoline are very satisfactory. Examples of other of the numerous photodecomposable compounds include pentabromoethane, iodoform, tetrachlorotetrahydronaphthalene, 2,6-di-(4-azidobenzylidene)-4-methylcyclohexanone, 4-azidoacetanilide, 2-nitraminopyridine or pentachloroethane.

Volatile compounds which can easily be immobilized by the decomposition products of the trihalogenomethyl type photodecomposable compounds include many photographic developing agents. These can be distilled or sublimed from the non-image areas to a receiving sheet containing an activating agent such as a ferric salt, a silver salt or a coupling compound and they are combined to form a metal deposit or a dye image.

Alternatively, various volatile dye intermediates may be used which distill over a receiving sheet containing a metal salt or a complementary dye intermediate so as to form a metal or dye image. Also two complementary volatile dye intermediates may be contained in the light sensitive master sheet, in which case the receiving sheet contains a catalyst such as a small amount of an acid or base. The complementary intermediates contact the catalytic material and react to form an image when they are transferred to the receiving sheet by heating.

The final image on the receiving sheet may be composed both of a dye and of a metal salt by use of a suitable combination of volatile compounds and reagents in the receiving sheet. The use of such combinations often improves the range of colors which may be obtained in the final image.

Figure 2:
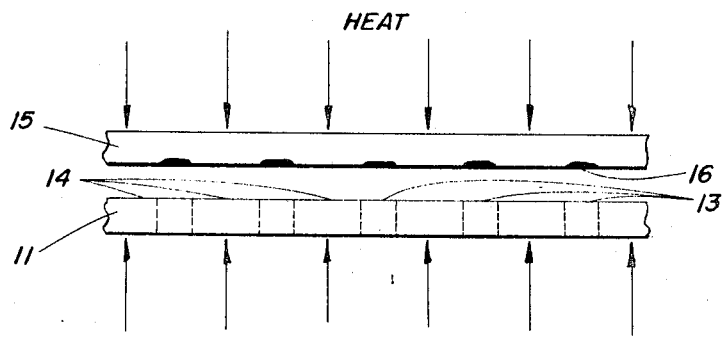
Figure 3:
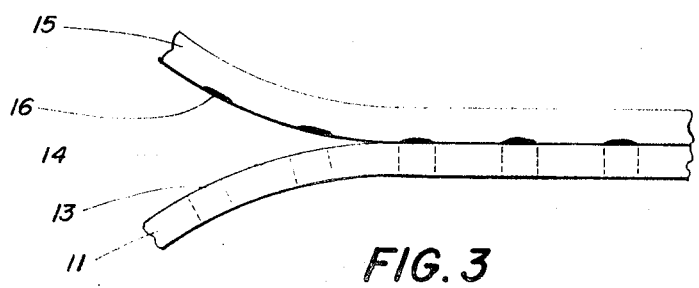

A further understanding of the invention will be had upon reference to the drawing wherein:

FIGURE 1 shows a master sheet 11 having a volatile compound and a total decomposable compound thereon or therein. Actinic radiation is directed, for example, through an original document 10 having indicia 12. A portion 14 of master sheet 11 which is not masked by indicia 12 is exposed to the actinic radiation and the decomposition products of the decomposable compound combine with the volatile compound to form a relatively non-volatile substance. However, in the portion 13 of master sheet 11 which is masked by indicia 12, the volatile compound is not altered. It is to be understood of course that the document 10 and sheet 11 would preferably be in contact with each other but are shown in spaced-apart relationship for purposes of illustration and clarity;

FIGURE 2 shows master sheet 11 adjacent receiving sheet 15 while in a heated condition. As a result of the heat, the volatile compound migrates from the unexposed portions 13 of master sheet 11 to form an image 16 on receiving sheet 15. However, no migration takes place in exposed portions 14 of master sheet 11 since the volatile compound is combined with the decomposition products of the photodecomposable compound. Again the sheets are shown in a spaced apart relationship for purposes of illustration;

FIGURE 3 shows more accurately the actual relationship of master sheet 11 and receiving sheet 15 as they are being separated. Receiving sheet 15 having thereon image 16 is an accurate right-reading facsimile of original document 10 and having indicia 12 thereon. The volatile compound at the unexposed portion 13 of master sheet 11 is not necessarily expanded by the making of a single copy and can often be used to make several additional copies.

Though exposure has been shown as a simple masking operation for purposes of illustration, it can of course be by any of the many well-known means of exposing an image upon a photosensitive material. A lens can be employed to project the image as in a photographic camera. Reflex exposure can also be employed if the master sheet is not opaque.

Heating of the sandwiched master sheet and receiving sheet can be accomplished by conduction, convection or radiation. Passing between heated rollers or passing a heated roll over the sandwich is a simple and desirable expedient. Also, a sandwich can merely be placed in a heated chamber or heated gas can be impinged thereon. The sandwich may include materials which absorb infrared radiation and heating can be accomplished by merely exposing it to such radiation.

Other exposure and heating means will be readily apparent to those skilled in the art.

The following examples illustrate the method of photographic reproduction of the invention. It is to be understood that while numerous examples of operable embodiments of the invention are set forth below, no attempt has been made to list all, or even a major portion, of the many workable embodiments of the invention. To do so would merely burden the discussion with alternative and redundant details apparent to those skilled in the art when provided with the instant disclosure of the invention.

Example 1

A volatile compound, 4 - aminodiphenylamine (0.5 gram), and a photodecomposable compound, carbon tetrabromide (0.25 gram), were dissolved in methanol (10 ml.). A sheet of filter paper was impregnated with this solution and the paper allowed to dry. The thus prepared master sheet was exposed for 15 minutes through a stepwedge to a 125 watt ultraviolet lamp at 10 inches and a print-out image of the wedge was obtained. On contacting the print-out image with various receiving sheets and heating the sandwich at 140° C. for 10 seconds, a positive image of the original wedge is obtained on the receiving sheets. The receiving sheets contain:

(a) ferric chloride, when the 4-amine-diphenylamine is oxidized to give a brown image or
(b) a non light-sensitive silver salt (silver behenate) when a brown-black silver image is formed or
(c) 4 - dimethylaminobenzaldehyde when a red dye is formed or
(d) N-nitrosodiphenylamine when a violet-black azo dye is obtained.

The photodecomposable compound, carbon tetrabromide in this example, may be replaced by other photodecomposable compounds such as pentabromoethane, iodoform, tetrachlorotetrahydronaphthalene, 2 - (tribromomethyl) quinoline, 2,6 - di - (4 - azidobenzylidene) - 4 - methylcyclohexanone, 4 - azidoacetanilide or 2 - nitraminopyridine.

The volatile compound, 4-aminodiphenylamine in this example, may be replaced by such volatile compounds as 4 - dimethylaminodiphenylamine, N,N' - diphenyl - p-phenylenediamine, N - nitrosodiphenylamine or 4 - amino-dimethylaniline, the main criterion being that the compound must be capable of transfer by a heat treatment, preferably at a temperature within the range of 50° C. to 200° C., onto a receiving sheet and there form a visible image with an appropriate reagent.

These compounds, which may be combined into a large number of operable embodiments, are merely examples of the numerous known color-forming systems. The 4-aminodiphenylamine and carbon tetrabromide system illustrated in this example are only sensitive to ultraviolet and blue radiation. The system can be sensitized into the green region of the spectrum by the addition of the sensitizing compounds bis - (3 - ethyl - 2 - benzothiazole)-trimethine cyanine bromide and into the red region by the addition of bis-(3-ethyl-2-benzothiazole)-pentane-thine-cyanine iodide.

Example 2

A master sheet was produced by coating at a thickness of 0.005 inch a dope containing 4-aminodiphenylamine (.05 gram) carbon tetrabromide (1.5 grams) and ethyl cellulose (0.5 gram) in methanol (20 ml.) on thin paper and drying the coated paper. The master sheet was exposed as described in Example 1 and contacted with a receiving sheet containing silver behenate. On heating the sandwich at 140° C. for 10 seconds a black positive image was obtained on the receiving sheet.

Example 3

A dope containing the volatile compound 1-methyl-2-phenylindolizine (0.4 gram), carbon tetrabromide (1.2 grams) and polystyrene (6 grams) in toluene (30 c.c.s.) was coated at 0.005 inch thickness on paper and dried to form a master sheet. This thus formed master sheet was exposed for 15 minutes through a step wedge to a 100 watt tungsten lamp at 10 inches and a green print-out image was obtained. The exposed master sheet was placed in contact with a receiving sheet and the sandwich heated at 140° C. for 10 seconds. A positive image of the original wedge was obtained on the receiving sheet.

Examples of receiving sheets which were used are:
(a) 5,3' - ethoxyallylidene - 1,3 - diethyl - 2 - thiobarbituric acid (0.6 gram) in 30 ml. of 10% cellulose nitrate in acetone, coated at 0.005 inch thickness on paper. This gives a blue-green image.
(b) 1 - n - butyl - 3 - carboxymethyl - 5,3' - ethoxy - allylidene barbituric acid (0.6 gram) in 30 ml. of 10% cellulose nitrate in acetone, coated at 0.005 inch thickness on paper. This gives a blue image.
(c) paper, impregnated with ferric chloride gives a green image.
(d) paper, impregnated with silver behenate gives a brown image.
(e) paper, impregnated with p-diazodimethylaniline gives a brown image.

The 1 - methyl - 2 - phenylindolizine in this example may be replaced by other volatile compounds such as 1,2-diphenylindolizine, 1 - p - aminophenyl - 2,5 - dimethylpyrrole, 1 - p - hydroxyphenyl - 2,5 - dimethylpyrrole or 1-p-hydroxyphenyl-2,5-dimethylpyrrole.

Alternatively the photodecomposable compound carbon tetrabromide in this example may be replaced by other photodecomposable compounds such as iodoform or pentabromoethane.

The indolizine-carbon tetrabromide system given in this example is sensitive to the red and green regions of the spectrum as well as the blue and ultraviolet. This presumably occurs because the dye formed at the print-out stage acts as a spectral sensitizer.

Example 4

A dope containing the volatile compounds 4-aminodiphenylamine (0.1 gram) and 1-methyl-2-phenylindolizine (0.1 gram) with carbon tetrabromide (1.0 gram) as a photodecomposable compound and ethyl cellulose (0.5 gram) in methanol (20 ml.) was coated at 0.005 inch thickness on a polyethylene terephthalate support and dried to form a master sheet. The thus formed master sheet was exposed to an original by the reflex method for 15 minutes using a 100 watt tungsten lamp at 10 inches. The exposed master sheet was placed in contact with a receiving sheet containing silver behenate and the sandwich was heated at 140° C. for 3 seconds. A black positive copy of the original was obtained on the receiving sheet.

Example 5

The volatile compounds 1-methyl-2-phenylindolizine (0.1 gram) and 4-dimethylaminobenzaldehyde (0.07 gram) and the photodecomposable compound carbon tetrabromide (0.33 gram) were dissolved in methanol (7 ml.). A sheet of filter paper was impregnated with this solution and the paper dried to form a master sheet. The master sheet was exposed behind a step wedge to a 125 watt ultraviolet lamp at a distance of 10 inches for 5 minutes to obtain a negative image. The exposed master sheet was placed in contact with a receiving sheet containing 5,3'-ethoxyallylidene-1-n-butyl - 3 - carboxymethyl-barbituric acid and the sandwich was heated at 140° C. for 10 seconds. A blue positive image was obtained on the receiving sheet.

Example 6

A solution in methanol (7 ml.) of the volatile compounds 1-methyl-2-phenylindolizine (0.1 gram) and 4-dimethylaminobenzaldehyde (0.07 gram) and 4-dimethyl-aminodiphenylamine (0.1 gram) with the photodecomposable compound carbon tetrabromide (0.33 gram) was poured on filter paper. The dried paper was exposed behind a step wedge to a 125 watt ultraviolet lamp at a distance of 10 inches for 5 minutes to obtain a negative image. A black positive record of the original was obtained by placing the exposed paper in contact with a receiving sheet containing silver behenate and heating the sandwich at 140° C. for 10 seconds.

Example 7

The volatile compounds 1-methyl-2-phenylindolizine (0.1 gram) and 4-dimethylaminobenzaldehyde (0.075 gram) with the photodecomposable compound tetrachlorotetrahydronaphthalene (0.2 gram) were dissolved in a mixture of ethyl acetate (5 ml.) and methanol (5 ml.) and the solution added to a solution of ethyl cellulose (1 gram) in methanol (20 ml.). The resulting dope was coated on paper at the rate of 0.5 gram ethyl cellulose per square foot to form a master sheet. The dried coating was exposed behind a step wedge to a 125 watt ultraviolet lamp at a distance of 10 inches for 15 minutes to obtain a negative image. The exposed master sheet was placed in contact with a receiving sheet of paper coated with polyvinylphthalate and the sandwich was heated at 140° C. for 10 seconds. A blue positive copy of the original was obtained on the receiving sheet. Further copies (up to 4 legible copies) could be obtained from one exposed master sheet by successively placing it in contact with further receiving sheets and heating them in the same manner.

The 4-dimethylaminobenzaldehyde in the above example was replaced by 1-ethyl-2,5-dimethylpyrrole-3-aldehyde (0.075 gram) and a similar magenta image was obtained.

The tetrachlorotetrahydronaphthalene in this above example was replaced by other photodecomposable compounds such as pentachloroethane, carbon tetrabromide or 2-(tribromomethyl) quinoline, whereby the exposure times were reduced to as short as 5 minutes.

Example 8

The volatile dye, dimethyl yellow (p-dimethylaminoazobenzene) (0.05 gram) and carbon tetrabromide (0.3 gram) were dissolved in toluene and added to a 20% solution of polystyrene in toluene. The dope was coated on paper and dried to form a master sheet. The master sheet was exposed behind a step wedge to a 125 watt ultraviolet lamp at a distance of 10 inches for 15 minutes to give a magenta negative image. The negative was placed in contact with a thin sheet of paper and heated at 120° C. to 140° C. for 10 seconds. A yellow copy of the original was obtained on the receiving sheet by distillation of the yellow dye from the non-image areas. Instead of plain paper, paper coated with polyvinylphthalate may be used, in which case a magenta copy results.

The volatile dye, dimethyl yellow, in this above example may be replaced by other volatile dyes such as p-aminoazobenzene.

The carbon tetrabromide in the above example may be replaced by other photodecomposable compositions such as pentabromoethane.

Example 9

A dope containing 1-methyl-2-phenylindolizine (0.1 gram), p-dimethylaminobenzaldehyde (0.075 gram), pentabromoethane (0.3 gram) and ethyl cellulose (1.5 gram) in toluene (30 ml.) was coated at 0.004 inch thickness on paper and dried to form a master sheet. The master sheet was exposed with an original for 5 minutes to a 125 watt ultraviolet lamp at a distance of 10 inches to obtain a negative image. The exposed master sheet was placed in contact with a receiving sheet of paper coated with polyvinylphthalate and the sandwich was heated at 140° C. for 10 seconds. A blue positive copy of the original was obtained on the receiving sheet. Another two copies were obtained from this exposed master sheet by heating it with further receiving sheets.

From the above discussion, drawings and examples, it will be apparent that the instant invention has broad utility utilizing known reactants and reactions in a heretofore unknown manner. Photodecomposable compounds are widely known and, because of their nature, produce decomposition products which often are reactive. Before the instant invention, such compounds were usually considered troublesome in that special handling is required to prevent decomposition and, when decomposed, often contaminate other compounds because of the reactive nature of the decomposition products. These normally undesirable characteristics produce a desirable result in the instant invention.

As will be noted from the examples, a large number of the systems which produce images in black-and-white and color photography, and special applications thereof such as blueprinting, are also operable in the instant invention with the proper choice of the volatile compound. However, despite the applicability of reactions which normally require liquid processing, the instant invention produces images without reverting to a liquid processing step. Those skilled in the art are well aware of the convenience and importance of dry reproduction. This is particularly important in document application facsimiles.

Summarily, the instant invention concerns a photothermographic reproduction process wherein the shortcomings of thermography are avoided by utilizing a photographic exposure of the original. However, no liquid development step is required and printing is by thermographic means. Thus the invention displays the advantages of photography and thermography while substantially avoiding the disadvantages of both processes.

The invention has been described in detail with particular reference to preferred embodiments thereof, but it will be understood that variations and modifications can be effected within the spirit and scope of the invention as described hereinabove and as defined in the appended claims.

We claim:
1. A process for thermographic reproduction comprising:
(A) exposing an image defined by actinic radiation upon a surface of a master sheet comprising at least one photodecomposable compound of the class defined by the formula:

$$R—C(X)_2Y$$

wherein

R represents an organic residue or halogen atom,
X represents a halogen atom,
Y is a hydrogen atom or halogen atom,
said master sheet also containing at least one volatile compound selected from the group consisting of 4-aminodiphenylamine, 4 - dimethylaminodiphenylamine, N,N'-diphenyl-p-phenylenediamine, N-nitrosodiphenylamine, 4-aminodimethylaniline, 1-methyl-2-phenylindolizine, 1,2-diphenylindolizine, 1-p-aminophenyl-2,5-dimethylpyrrole, 1-o-hydroxyphenyl-2,5-dimethylpyrrole, 1-p-hydroxyphenyl-2,5-dimethylpyrrole, 4-dimethylaminobenzaldehyde, 1-ethyl-2,5-dimethylpyrrole-3 - aldehyde, p-dimethylaminoazobenzene, or p-aminoazobenzene, whereby upon exposure the decomposition products of the photodecomposable compounds react with the volatile compound in the areas of exposure to form a substantially nonvolatile product in the areas of the master sheet exposed to radiation;

(B) placing the exposed sheet in contact with a receiving sheet; and
(C) heating at least the exposed sheet to transfer the unreacted volatile compound from the unexposed portion of the master sheet to the receiving sheet whereby the transferred volatile compound causes an image to be formed on the receiving sheet.

2. A process as set forth in claim 1 wherein the photodecomposable compound is selected from the group consisting of carbon tetrabromide, 2-(tribromomethyl) quinoline, pentabromoethane, iodoform, tetrachlorotetra-hydronaphthalene, 2,6 - di-(4-azidobenzylidene)-4-methylcyclohexanone, 4-azidoacetanilide, 2-nitraminopyridine and pentachloroethane.

3. A process as set forth in claim 1 wherein the receiving sheet has an activating agent and the volatile compound is a compound which reacts with said agent in the receiving sheet to form a colored compound.

4. A process as set forth in claim 3 wherein the activating agent of the receiving sheet is ferric chloride, ferric behenate.

References Cited

UNITED STATES PATENTS

| | | | |
|---|---|---|---|
| 2,910,377 | 10/1959 | Owen | 117—36.8 |
| 3,046,209 | 7/1962 | Sprague. | |
| 3,080,254 | 3/1963 | Grant | 117—36.8 |
| 3,102,810 | 9/1963 | Sprague et al. | 96—90 X |
| 3,218,166 | 11/1965 | Reitter | 96—67 |

OTHER REFERENCES

Goulde: Mechanism and Structure in Organic Chemistry, 1959, p. 115.

NORMAN G. TORCHIN, Primary Examiner

RICHARD E. FICHTER, Assistant Examiner

U.S. Cl. X.R.

117—36.8; 250—65.1